(12) United States Patent
Harbin

(10) Patent No.: US 6,412,480 B1
(45) Date of Patent: Jul. 2, 2002

(54) DETACHABLE LEGS FOR VERTICAL HEARTH BARBECUE GRILL

(76) Inventor: Lawrence Harbin, 2906 Maplewood Pl., Alexandria, VA (US) 22302

( * ) Notice: Subject to any disclaimer, the term of this patent is extended or adjusted under 35 U.S.C. 154(b) by 0 days.

(21) Appl. No.: 09/575,241

(22) Filed: May 22, 2000

(51) Int. Cl.[7] ................................................. A47J 37/07
(52) U.S. Cl. ................. 126/25 R; 126/9 R; 126/304 R; 248/151; 248/165; 248/188
(58) Field of Search ............... 126/25 R, 9 R, 126/913, 304 R, 304 A; 248/151, 165, 188, 188.1, 188.8, 163.1, 440.1

(56) References Cited

U.S. PATENT DOCUMENTS

| | | | | |
|---|---|---|---|---|
| 2,515,521 A | * | 7/1950 | Loffredo | 126/304 A |
| 3,182,585 A | | 5/1965 | Rensch et al. | 99/340 |
| 3,230,948 A | * | 1/1966 | Schmitt | 126/25 R |
| 3,306,280 A | * | 2/1967 | Vannoy | 126/25 R |
| 3,999,472 A | | 12/1976 | Einto | 99/340 |
| 4,063,703 A | * | 12/1977 | Shy | 126/304 A |
| 4,106,473 A | * | 8/1978 | Wandel | 126/25 R |
| D253,804 S | | 1/1980 | Wandel | D7/107 |
| 4,768,825 A | | 9/1988 | Quinlan, Jr. | 297/39 |
| 5,406,931 A | | 4/1995 | Montgomery | 126/30 |
| 5,823,174 A | * | 10/1998 | Andress | 126/25 R |
| 5,947,007 A | * | 9/1999 | O'Grady et al. | 126/25 R |
| D417,120 S | | 11/1999 | Dutro | D7/332 |
| 6,000,388 A | * | 12/1999 | Andress | 126/25 R |
| 6,182,560 B1 | * | 2/2001 | Andress | 126/25 R |
| 6,196,116 B1 | * | 3/2001 | O'Grady et al. | 126/25 R |

* cited by examiner

Primary Examiner—Sara Clarke
(74) Attorney, Agent, or Firm—McIntyre Harbin & King

(57) ABSTRACT

Detachable legs and side handles for a portable barbecue grill that interlock with each side of a barbecue grill wherein the grill has a flexible base to provide self-leveling of the legs. The leg members, among other things, provide stability against rearward tipping of the grill, provide both a stop to restrict opening of the grill's side panels and rotation of the grill lid or dome, and provide an elongated handle spanning the approximate range of the grill's front-to-ear center of gravity. Also, an alternative handle or side shelf may be held in position by friction clamping or complementary interlocking pins/receptacles after clamping the legs to the sides of the grill. The detachable legs may take on a variety of other shapes, including an inverted U-shape, trapezoidal, partial parallelogram, or a combination thereof. The leg assembly is also segmented so that they fit inside the grill for portability, storage, or shipment.

18 Claims, 4 Drawing Sheets

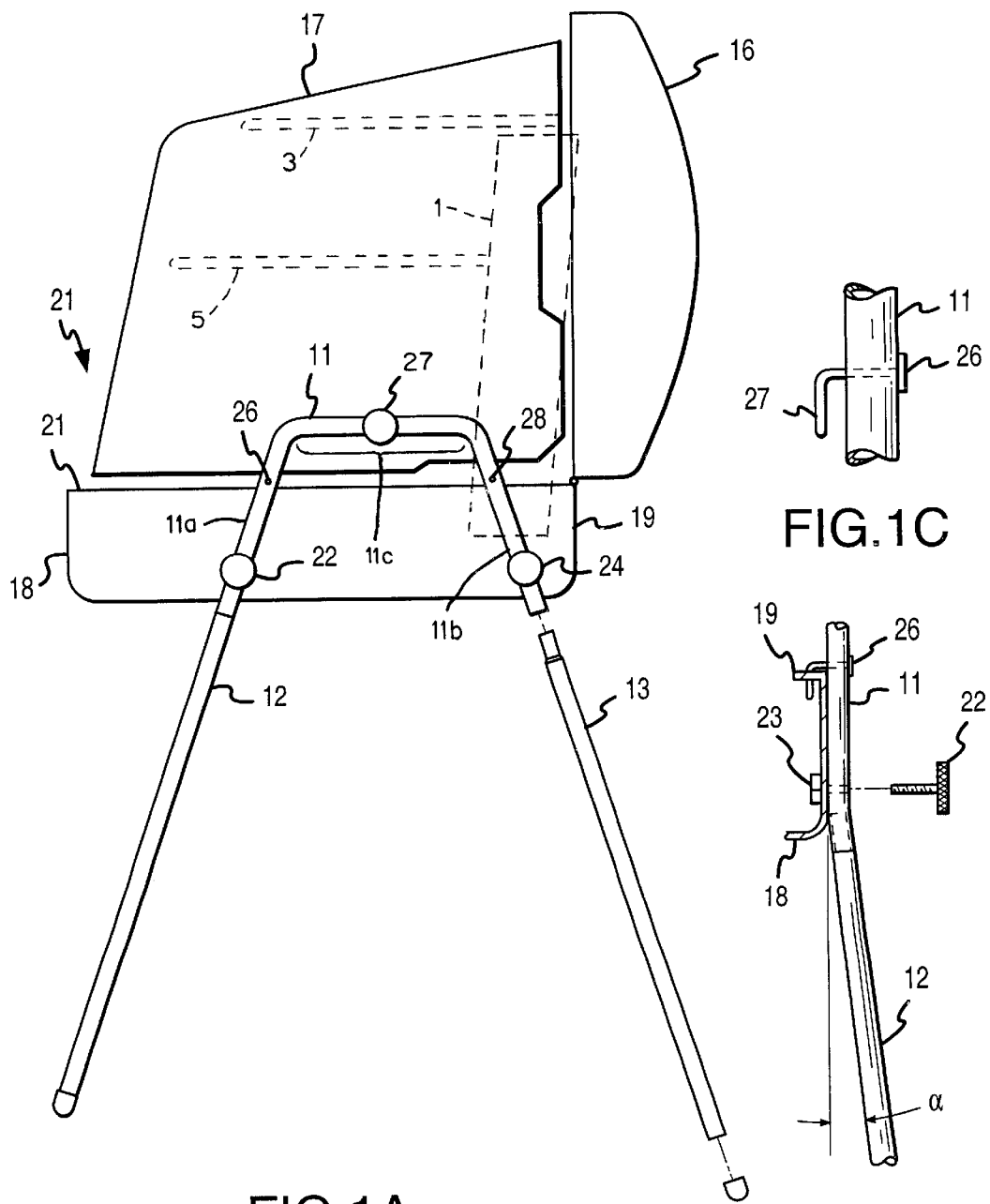

DETACHABLE LEGS FOR VERTICAL HEARTH BARBECUE GRILL

CROSS-REFERENCE TO RELATED APPLICATION

This invention is related to U.S. patent application Ser. No. 09/544,336 entitled Vertical Hearth Barbecue Grill Improvements filed Apr. 6, 2000, in the names of Alphonso G. Andress and Lawrence Harbin, which is incorporated herein.

BACKGROUND OF THE INVENTION

This invention relates to supporting legs for a barbecue grill, but more specifically to detachable legs providing stability against rearward tipping of a barbecue grill having a shifting center of gravity making it subjected to rearward tipping upon loading.

Portable barbecue grills and broilers provide the convenience of mobility. Overall compactness of these devices make them desirable for shipment, storage, or transport but providing a leg construction that permits internal storage of legs and other conveniences presents design challenges in appearance design, functionality, and safety. Ideally, the legs should provide a minimum height of the grill when deployed, provide quick and secure attachment, level positioning even on non-planar surfaces, and importantly, provide stability against tipping under various use or load conditions. Prior legs designs have provided leg attachment under the grill's housing which, among other things, have mechanically complexity, undue weight, instability, obtrusiveness, or require a sub-frame or strengthening of the housing. Other designs, such as those shown in U.S. Pat. No. 4,768,825 to Quinlan, Jr.; U.S. Pat. No. 5,406,931 to Montgomery; U.S. Pat. No. 3,999,472 to Einto; U.S. Pat. No. 3,182,585 to Rensch et al.; D253,804 to Wandel; and D417,120 to Dutro, et al. are not readily detachable and/or do not provide the functionality stated herein.

SUMMARY OF THE INVENTION

One problem encountered and addressed during development of the present invention was directed to providing leg members that fit inside a relatively small housing of the grill or shipping container, that quickly and firmly attaches to the grill housing, that provide stability on non-planar surfaces, that provide a handle straddling the grill's front-to-back center of gravity, and that provides stability against backward tipping when the grill's load is shifted.

Another problem solved particularly for vertical hearth barbecue grill relates to providing elongated side handles for grasping the grill at various center of gravity positions and/or providing a stop or support for side folding panels hinged to a lid of the grill.

In accordance with one embodiment of the invention, there is provided a vertical hearth barbecue grill having a front-to-rear center of gravity that varies during use where the grill comprises a generally rectangular base having a front, rear and respective sides; a vertical hearth and at least one cooking grid elevated above the base that is subjected to varying load conditions that alter the front-to-rear center of gravity of the grill; a detachable side bar for each side of the grill in the form of an elongated span wherein the span includes respective front and rear downwardly extending appendages and the elongated span traverses a range of the front-to-rear center of gravity of the grill according to varying load conditions in order to provide a handle for grasping the grill within the center of gravity range; and a fastening structure on each side of the grill to permit fastening of the side bar to the base.

In a another embodiment of the invention, these problems were solved by providing detachable leg member on each side of the grill housing in the form of a tubular or sheet metal frame where a top portion of the leg member interlocks with the sides the grill, e.g., an elongated flange or slot opening on each side of the grill housing and a fastener, e.g., a screw bolt, clamp, cam lock, etc., that fastens the detachable leg member to the grill housing such that the appending ends of the legs extend rearward of the range of the grill's front-to-rear center of gravity. In another aspect of the invention, the grill housing comprises sheet metal possessing a minimum degree of torsional flexibility about an axis that extends from side-to-side so as to permit self-leveling of four legs. In addition, to achieve compactness, each leg may be segmented and/or hinged so that portions thereof fit inside the grill housing. Other implements, such as a protruding handle or a side shelf, may be held in place by friction clamping or interlocking with the leg members. The legs may take on a variety of other shapes, including an A-frame, a U-shape, a partial parallelogram, or a combination thereof.

These and other aspects and features of the invention will become apparent upon review of the following description taken in conjunction with the accompanying drawings. The invention, though, is pointed out with particularity by the appended claims.

BRIEF DESCRIPTION OF THE DRAWINGS

FIG. 1A illustrates a side view a basic improvement provided one aspect of by the present invention, which includes detachable legs attached to respective side panels and to sides of a vertical barbecue grill;

FIG. 1B depicts a side view of the detachable legs of FIG. 1A.

FIG. 1C is an expanded view of an illustrative interlocking structure of FIG. 1A.

DESCRIPTION OF ILLUSTRATIVE EMBODIMENTS

Figure 1D:
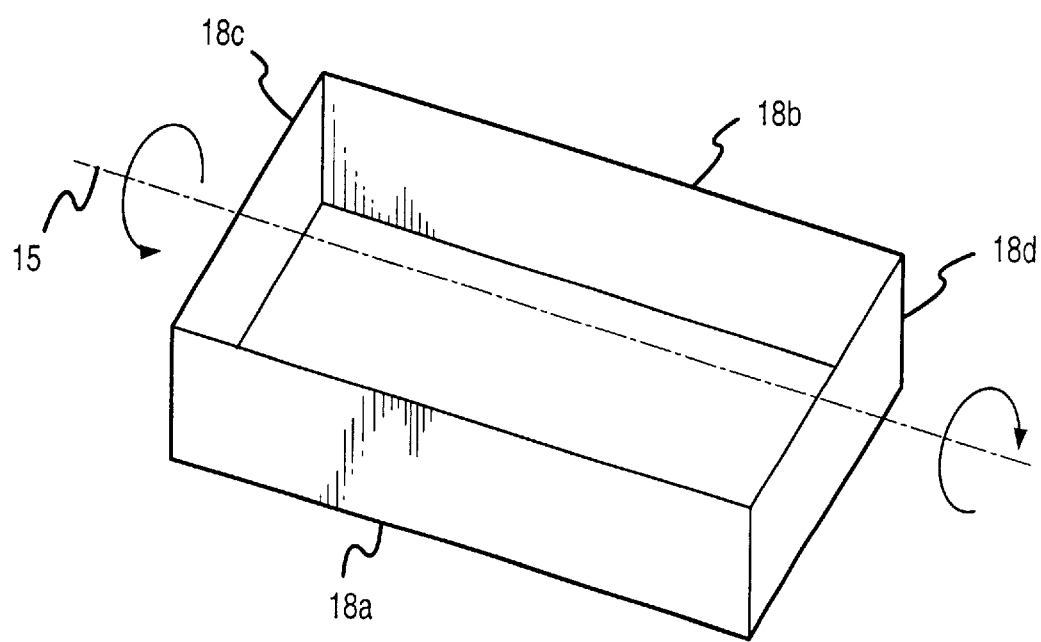
FIG. 1D conceptually illustrates the torsional flexibility of the base of the grill of FIG. 1A.

FIGS. 1A, 1B, and 1C show an improvement which includes a or side bar 11 along with detachable legs 12 and 13 for each side of the barbecue grill. Side bar 11 has an elongated upper span 11c that provides an elongated handle for grasping the grill as various centers of gravity, as well as front appendage 11a and rear appendage 11b. The grill includes a housing 18, a lid or dome 16, and a pair of side panels 17 that are pivotally hinged to the dome 16. As also disclosed in incorporated U.S. Pat. Nos. 5,823,174; 5,947,007; and 6,000,388, the vertical hearth barbecue grill includes a vertical hearth land cooking grids 3 and 5 that carrying foodstuff, which subject the grill to varying load condition altering the grill's center of gravity. The side bar 11 attaches to respective sides of a barbecue grill housing 10 and extends upwardly above base 18 to secure side panel 17. The appendages 11a and 11b of side bar 11 is shown separated from legs 12 and 13 in order to more easily fit inside the grill 10, but if desired, their structure may be integrated in a single piece comprising elements 11, 12 and 13. The legs comprise, preferably, tubular metal such as steel, aluminum, or other metal. The cross-sectional shape preferably is circular, square, or rectangular. When segmented in the manner shown, a "vacuum cleaner" like hose attachment may be provided to interconnect the legs to side bar 11 where the diameter of the tubular end of legs 12 and 13 is reduced. Attachment of side bar 11 to the side of base housing 18 may be made by many means known in the art, but for portable models of grill 10 where the legs fit inside base 18, clamping, bolting, or latching is preferred for quick attachment.

FIG. 1B shows a knurled head screw 22 and, in a more detailed embodiment hook pin 26 protruding through side bar 11 and fastening respectively to a nut 23 welded inside the base housing 18 and to a hole in lip 19 on the top edge of base housing 18. The head of knurled head screw preferably has a diameter of one-and-a-half inches to enable sufficient hand-torque to fasten side bar 11 to base housing 18. A knob, spring-loaded clamp, or other clamping mechanism, instead, may also be employed. For added stability, the side bar 11 is beveled outwardly at an angle α of about five degrees, more or less, so that legs 12 and 13 when deployed, are angled outwardly from respective sides of the grill 10. An end 27 of pin 26, as more clearly depicted in FIG. 1C, is bent downward to protrude through a slot of lip 19 (FIG. 1B) of base housing 18 when fastened thereto. Since base 18 preferably comprises cold drawn steel, nut 23 and screw 22 may protrude through base 18 near its bottom where the metal is more rigid. A distance of at least two to three inches is provided between the top edge 21 (e.g., lip 19) and the axial position of screw-nut assembly 22, 23. Side bar 11 is thus securely and removably fastened to the side of base 18 via knurled head screws 22 and 24, as well as hook pins 26 and 28.

In actual use, the barbecue grill generally has a varying front-to-rear center of gravity during various load conditions, e.g., when adding briquettes, when briquettes burn off, or when adding or shifting meats. As clearly shown in FIG. 1A, the depending end of rear leg 13 is offset reward of the grill's center of gravity so as to reduce the likelihood of backward tipping upon opening lid 16 or loading foodstuff on various grids of the grill 10. The depending end of leg 13 extends beyond the edge 19 of base cavity 18. Grids and other components of grill 10 are described in commonly-owned U.S. patent application Ser. No. 09/544, 336, filed Apr. 6, 2000. Without a construction to account for shifts in weight, difficulties are encountered with legs that fold on the bottom of the grill because, when providing side-to-side folding legs, the rear legs do not extend behind the plane of the rearward edge 19 of the base 18, and when providing front-to-rear folding legs the legs are too short to provide adequate height of a portable grill of the desired size and dimensions. The present invention advantageously overcomes this problem by providing front and rear appendages 11a and 11b that straddle the front-to-rear center of gravity of the grill. The grill and its housing 10 and other components are more particularly described in U.S. Pat. Nos. 6,196,116; 6,182,560; 6,158,330; 5,823,174; 5,947,007; and 6,000,388, as well as U.S. patent application Ser. No. 09/515,035, each of which being incorporated herein by reference.

Advantageously, and as seen in FIG. 1A the upper span 11c of side bar 11 extends upwardly above of the top edge 21 of base 18 to provide a stop to restrict opening of side panel 17 that is hinged (not shown) to dome or lid 16. Side bar 11 also includes a third knurled head screw 27 (or other type of fastener) to secure side panel 17 in an open position and to prevent backward rotation of dome 16, which is pivotally connected to base 18.

A further advantage provided by the detachable leg member includes the elongated span 11c of side bar 11 being elongated from front to rear to span the approximate center-of-gravity range of grill 10 during its normal loading so that a user may grab and lift the grill about its center of gravity and move the unit in an about its area of use. Preferably, the elongated span 11c of side bar 11 extends about seven to eight inches. Although not limited to these dimensions, tubular metal of about ¾ to 1.0 inches in diameter was used for the side bar and leg members in one embodiment of the invention. The base 18 is rectangular (as illustrated in FIG. 1D) and measures twenty-two by sixteen inches in its current design. Moreover, in one construction, base 18 comprises cold drawn sheet metal of mild steel of about one millimeter thickness which is drawn to a depth of about three and three-quarter inches. The resulting structure has torsional flexibility about an axis 15 (FIG. 1D) extending from side 18c to side 18d of the base thereby to provide self-leveling of each leg pair, i.e., four legs, under its own weight (about twenty to thirty pounds) when placed on a non-planar surface. FIG. 1D symbolically illustrates base 18 having front 18a, rear 18b, and respective left and right sides 18c and 18d. Leg members are attached to sides 18c and 18d. It has been found that all four legs of grill 10 remain in contact with the ground when the side-to-side torsional flexibility of the housing 10 enables flexing to account for ground surface variations of about one half centimeter, or one to two centimeters, or more. Other materials, e.g., stainless steel or materials that provide a minimum amount of torsion, may be used for the base 18.

Accordingly, the present invention provides a self-leveling grill having four legs. The present invention, among other things, also provides a leg assembly that is detachable, that is stable against rearward tipping, that provides both a stop to restrict opening of the grill's side panels and rotation of the grill's lid or dome, and that provides an elongated handle spanning the approximate range of the gill's center of gravity.

Figures 2A, 2B, 2C:
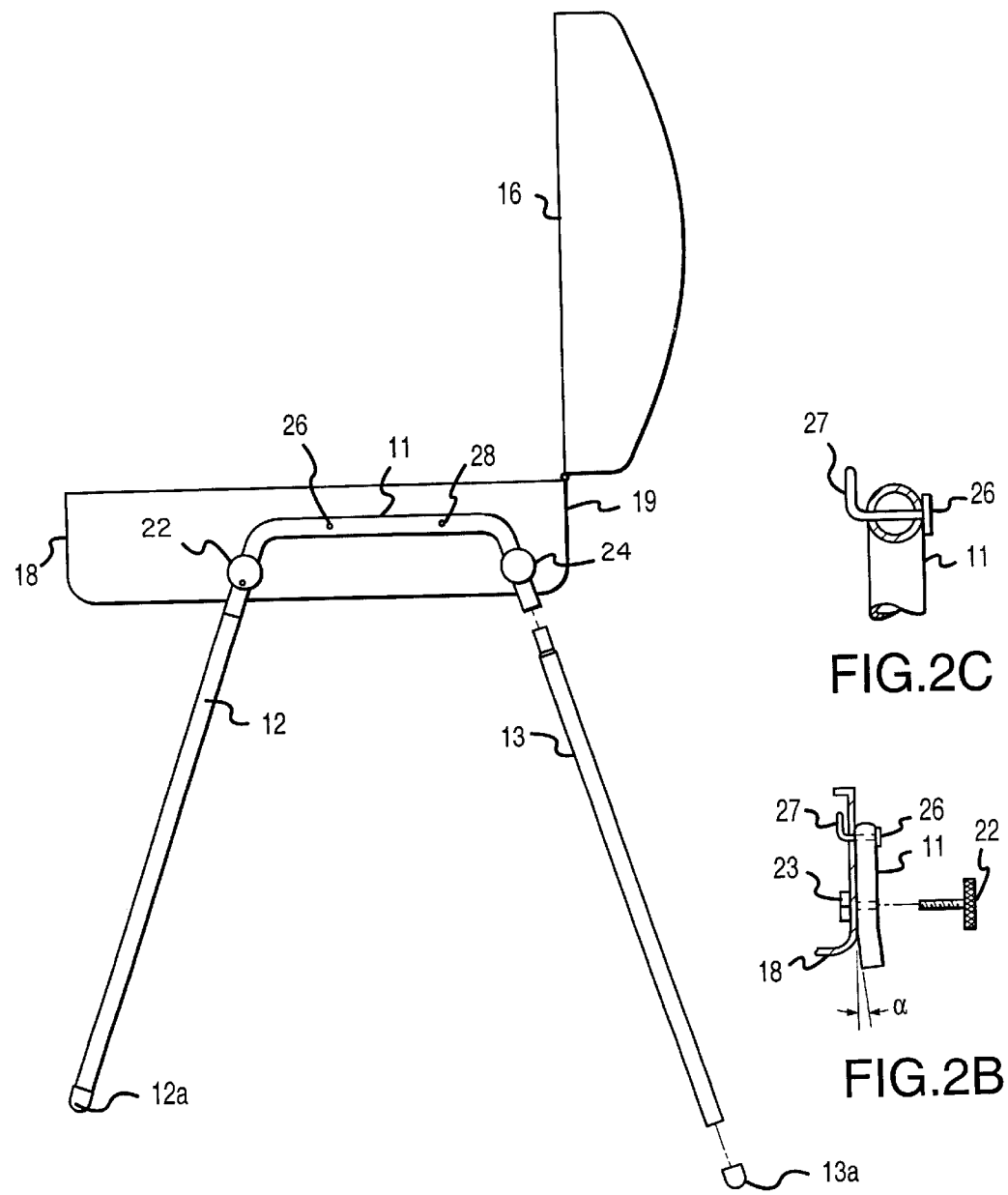
FIG. 2A illustrates a side view a basic improvement provided another aspect of by the present invention, which includes detachable legs attached to respective sides of a vertical barbecue grill.
FIG. 2B depicts a front view of the detachable legs of FIG. 2A.
FIG. 2C is an expanded view of an illustrative interlocking structure for detachable legs of FIG. 2A.

FIGS. 2A, 2B, and 2C where like numerals refer to corresponding elements described in connection with FIGS. 1A, 1B, and 1C, show a similar structure except that side bar 11 does not extend above the base 18. The embodiment of FIG. 2A also differs in that an end 27 of pin 26 is bent upward to protrude through the side of base 18. This arrangement offers nearly the same advantages of the arrangement of FIG. 1A for grills, vertical or otherwise, without side panels. Also, it is more compact.

Figure 3A:
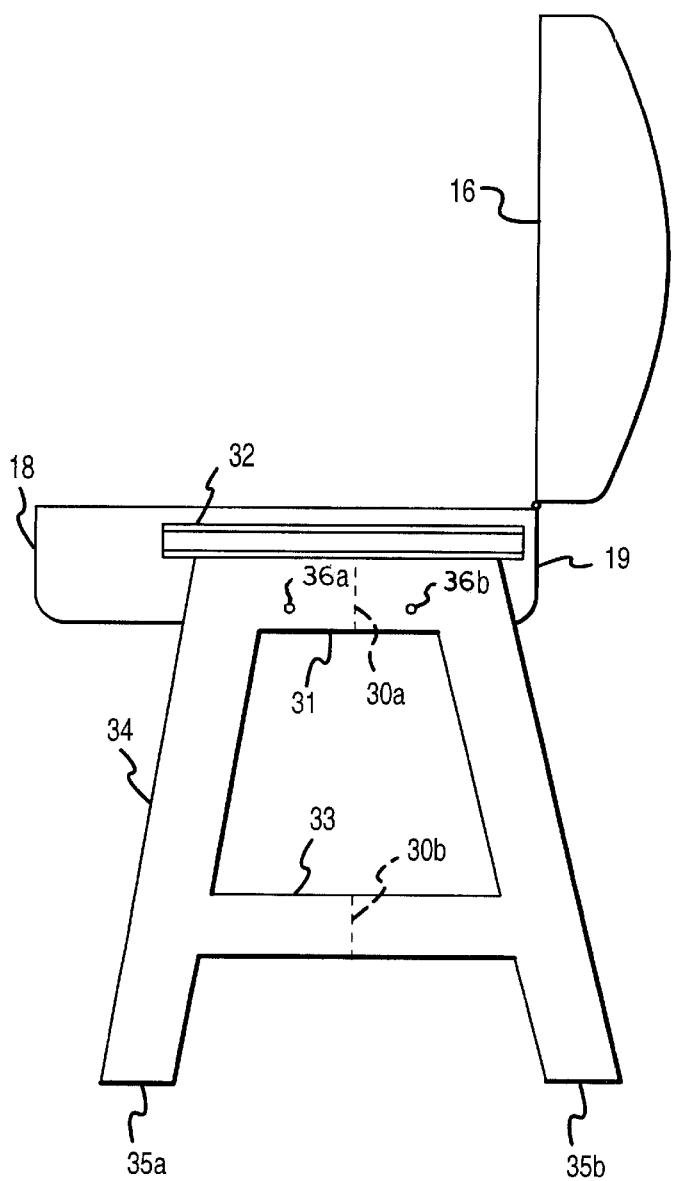
FIG. 3A shows a side view of an A-frame leg attached to a respective side of the base housing of a barbecue grill having a vertical component.

FIG. 3A shows an A-frame leg member and depicts a grill housing 10 where a flange 32, preferably a hard carbon steel, is welded or fixedly attached by other means known in the art to form a slot or receptacle that lies in a vertical plane parallel to the side of base 18. The slot receives an upper edge portion of A-frame leg 34. Holes 36a and 36b in A-frame leg 34 align with corresponding threaded holes, e.g., nuts, in the side of base 18 to enable bolting of the substantially flat A-frame 34 leg to the base 18. This forms a fastener that fastens the upper span 31 of A-frame leg 34 to a side of the base 18, whereby the attachment mechanism and fastener are located at upper and lower portions of the span 31 to provide a measurable vertical distance between them. This arrangement improves resistance against lateral flexing of the leg 34 on each side of the grill. Again, the slot receptacle and bolting are described for illustrative purposes only, it be understood that multiple other attachment mechanisms or interlocking arrangements may be employed.

Base 18 has a generally rectangular base with front, rear and respective sides. The lid or dome 16 mates with the base 18 in a generally clamshell fashion. A-frame leg 34, one adapted to attach to each side of base 18, has an upper span 31 and front and rear appendages 35a and 35b. To add additional support, A-frame leg optionally includes a cross member 33 that interconnects front and rear appendages 35a and 35b. The A-frame legs are attached at a front-to-rear location of the side of the base 18 so that at least the rear appendage 35b of the A-frame 34 extends beyond the rear plane 19 of the base 18. This helps to avoid backward tipping of the grill 10.

A-frame leg 34 may be hinged at junctions 30a and 30b to permit folding to occupy smaller dimensions to fit inside base 18. Preferably, piano hinges (not shown) are used to hinge each leg half at junctions 30a and 30b. If not hinged, the horizontal width of appendages 35a and 35b would be limited to the front-to-rear inside measurement of base 18. When folded, the appendages of leg 34 may have a greater front-to-rear width and may also fit inside base 18 or lid 16.

Preferably, the A-frame leg is formed by stamping sheet metal and includes rolled-up edges to increase resistance to lateral bending or flexing. Sheet metal having 0.20 to 0.30% carbon should provide sufficient strength for a portable model of grill 10. A three-eight to one-half inch edge roll should suffice for A-frame legs measuring eighteen to twenty-four inches in the vertical direction and fifteen to nineteen inch span between appendages 35a and 35b. The shape of A-frame leg may have other shapes including a U-shape, V-shape, open parallelogram, or a combination thereof.

Figure 3B:
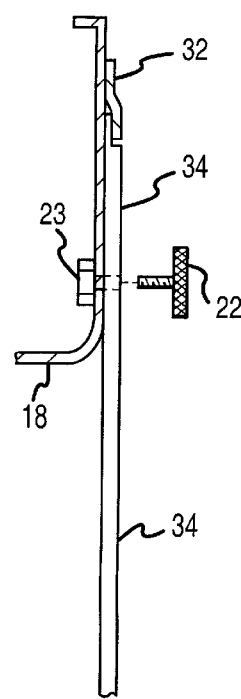
FIG. 3B is a front view of the detachable leg of FIG. 3A.

FIG. 3B shows, in spaced relation, the knurled head bolt 22 and nut 23 welded to the inside of base 18 after upwardly inserting the upper edge of leg 34 in the slot formed by flange 32 and base 18. Also shown is a vertical spacing between the axes of screw-nut assembly 22, 23 and the upper edge of span 31, which provides fastening of leg 34 flush and rigidly against the side of base 18. In the illustrated embodiment, a pair of handle holes may be provided to receive extensions of a simplified handle.

As indicated herein, the shape of the leg mat be tubular. The shape may be that of an A-frame, a U-shape (inverted), V-shape (inverted) or parallelogram. A symmetrical shape, however, facilitates manufacturing since both sides have the same leg. Further, such legs may or may not include the cross-member brace 33 as shown in FIG. 3A, for example. The legs may be dimensioned to fit inside the base 18 of grill 10, or larger to provide more flexible use and operation of the grill. The principal advantage provided by these various shapes includes providing a rear leg appendage that extends reward of the grill to improve stability against backward tipping, a relatively small structure having a small volume and that fits inside the base of the grill if desired, and quick and convenient attachment and detachment to the grill.

Other advantages described herein include the flexible nature the base to provide self-leveling of the legs, an elongated handle spanning the front-to-rear center of gravity for convenient transport and movement of the grill, and a raised elongated handle for securing the side panels and the dome.

Side shelves (not shown) or additional handles (not shown) also may be removably provided with each leg construction described above simply by providing complementary interlocking attachment elements on the side shelf and leg members 12, 13, and 34 above.

Based on the above teachings, alterations and modifications known to those skilled in the art may be made the illustrative embodiments and/or substitutions of the illustrative components may be made. For example, although a sheet metal (aluminum or steel) construction is shown, the legs may comprise tubular metal, wire rod, wood, fiberglass, or other structural material of sufficient strength to perform the desired support function. The invention may or may not include a flexible base, i.e., the base may indeed be rigid without departing from certain aspects of the invention. The handle provided by the side bar may have a variety of lengths. The overall size of the grill and associated components thereof may vary. Thus, it is my intent that such substitutions, alternations, and modifications be embraced by the appended claims. Accordingly, I claim:

What is claimed is:

1. In a vertical hearth barbecue grill having a generally rectangular housing a vertical hearth and at least one cooking grid elevated above said housing, a leg member and an attachment structure therefore comprising a front appendage and a rear appendage being formed with an elongated upper span that serves as a handle traversing a center-gravity-range of said grill, said elongated upper span having a length substantially greater than a hand width to permit grasping by hand at varying longitudinal positions thereof to compensate for shifts in center of gravity due to loading of said hearth with fuel above said span, said attachment structure providing fastening of the leg member to the housing so that at least a portion of the rear appendage extends towards a rear of the housing.

2. In the vertical hearth barbecue grill of claim 1, where the front and rear appendages are segmented.

3. In the vertical hearth barbecue grill of claim 1, wherein the rectangular housing is flexible to provide self-leveling of the grill on a surface having at least one-half centimeter in variation.

4. A vertical hearth barbecue grill having a generally rectangular base and a lid that mates with the base, said grill having a vertical hearth and at least one cooking grid elevated above said base that alters a front-to-rear center of gravity during various load conditions, rigid leg members that attach to respective sides of the base, each of said leg members being formed of an elongated, linear upper span having a length substantially greater than the width of a hand and downwardly extending front and rear appendages, the elongated upper span providing a handle to grasp the barbecue grill within a center of gravity range when attached at a front-to-rear location of the grill so that the front and rear appendages of each of said leg members straddle the front-to-rear center of gravity range of the grill.

5. The vertical hearth barbecue grill as recited in claim 4, wherein each leg member comprises an A-frame structure which includes a cross-member span interconnecting the appendages.

6. The vertical heath barbecue grill as recited in claim 5, wherein an elongated rigid flange fixedly attached to the side of the base forms a slot into which an edge portion of the upper span inserts.

7. The vertical heath barbecue grill as recited in claim 6, wherein the elongated rigid flange extends substantially between the front and rear extremities of the sides of the base so as to achieve maximum resistance against side-to-side flexing of the leg members when attached to the base.

8. The vertical heath barbecue grill as recited in claim 4, wherein attachment of the upper span to the side of the base comprises a complementary mating attachment structure.

9. The vertical heath barbecue grill as recited in claim 4, wherein the base is flexible to provide self-leveling capability.

10. A vertical hearth barbecue grill having a front-to-rear center of gravity that varies during use, said grill comprising:

a generally rectangular base having a front, a rear, and respective sides;

a vertical hearth and at least one cooking grid elevated above said base, said grid being subjected to varying load conditions that alter the front-to-rear center of gravity, a detachable single-piece side bar for each side of the grill in the form of an elongated span wherein the span includes respective font and rear downwardly extending appendages, said elongated span traversing a range of the front-to-rear center of gravity of the grill according to varying load conditions in order to provide a handle for grasping the grill within said range of said center of gravity; and a fastening structure on each side of the grill to permit fastening of the side bar to the base.

11. The vertical hearth barbecue grill as recited in claim 10, wherein the appendages comprise extended leg members, and the rectangular base has a side-to-side axial torsional flexibility to permit self-leveling of said leg members on a surface having at least one-half centimeter in variation.

12. The vertical hearth barbecue grill as recited in claim 10, wherein the front and rear appendages of the side bar include detachable leg members.

13. The vertical hearth barbecue grill as recited in claim 10, wherein the span of the side bar is located above the rectangular base to provide a stop to secure and restrict opening of side panels pivotally attached to the barbecue grill.

14. The vertical hearth barbecue grill as recited in claim 10, wherein the appendages of each side bar are angled outwardly from the base when attached thereto in order to provide greater side-to-side stability.

15. The vertical hearth barbecue grill as recited in claim 10, wherein the elongated span and appendages of the side bar are integrally formed of a single piece of tubular material.

16. The vertical hearth barbecue grill as recited in claim 15, wherein the appendages of the side bar extend beneath a lower plane of the base of the grill.

17. A vertical hearth barbecue grill having a center of gravity that varies during use, said grill comprising:

a generally rectangular base having a front, a rear, and respective sides;

a vertical hearth and at least one cooking grid elevated above said base, said grid being subjected to varying load conditions that alter the front-to-rear center of gravity;

a detachable side bar for each side of the grill in the form of an elongated span wherein the span includes respective front and rear downwardly extending appendages, said elongated span having a length substantially greater than a hand width to permit grasping by hand at varying longitudinal positions thereof, said elongated span traversing a range of the center of gravity of the grill according to varying load conditions of said hearth in order to provide a handle for grasping the grill within said range of said center of gravity and said appendages include extended leg members that attach to said appendages; and a fastening structure on each side of the grill to permit fastening of the side bar to the base.

18. A vertical hearth barbecue grill having a center of gravity that varies during use, said grill comprising:

a generally rectangular base having a front, a rear, and respective sides;

a vertical hearth and at least one cooking grid elevated above said base, said grid being subjected to varying load conditions that alter the front-to-rear center of gravity, a detachable side bar for each side of the grill in the form of an elongated span located above said rectangular base but below a center of gravity of said grill when loaded with briquettes and foodstuffs wherein the span includes respective front and rear downwardly extending appendages, said elongated span being located below said front-to-rear center of gravity during loading of said hearth and cooking grid, said elongated span having a length of greater than a hand width to permit grasping by hand at varying longitudinal positions thereof, said elongated span traversing a range of the center of gravity of the grill according to varying load conditions in order to provide a handle for grasping the grill within said range of said center of gravity; and a fastening structure on each side of the gill to permit fastening of the side bar to the base.

\* \* \* \* \*